April 21, 1936.  W. B. BRONANDER  2,037,701
MACHINE OR APPARATUS FOR USE ON RAILWAY TRACKS
Filed Oct. 6, 1933  4 Sheets-Sheet 1
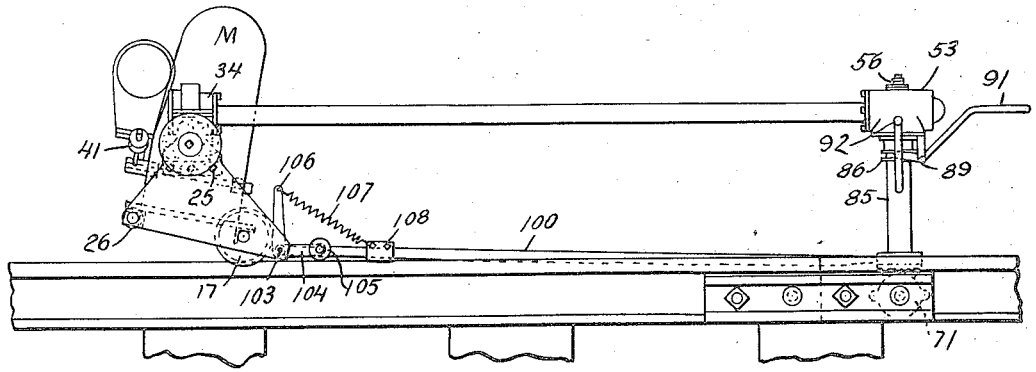
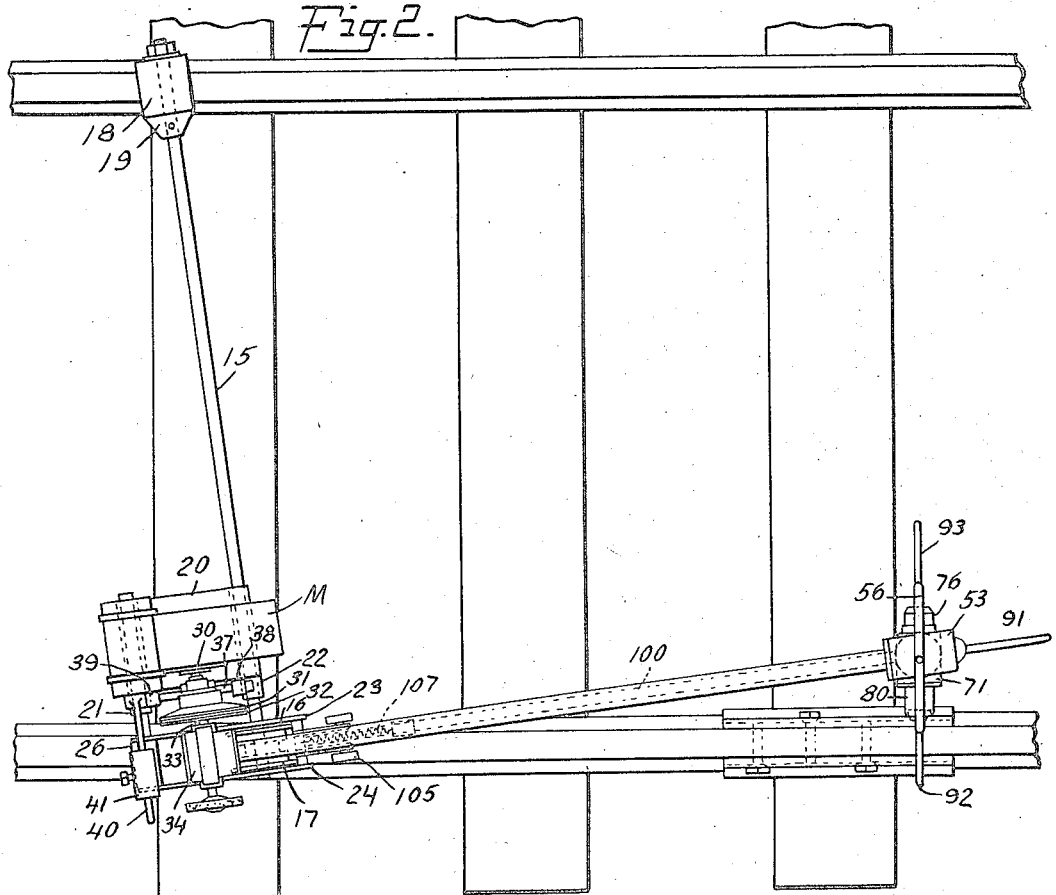
INVENTOR
Wilhelm B. Bronander
BY
Marshall & Hawley,
ATTORNEYS

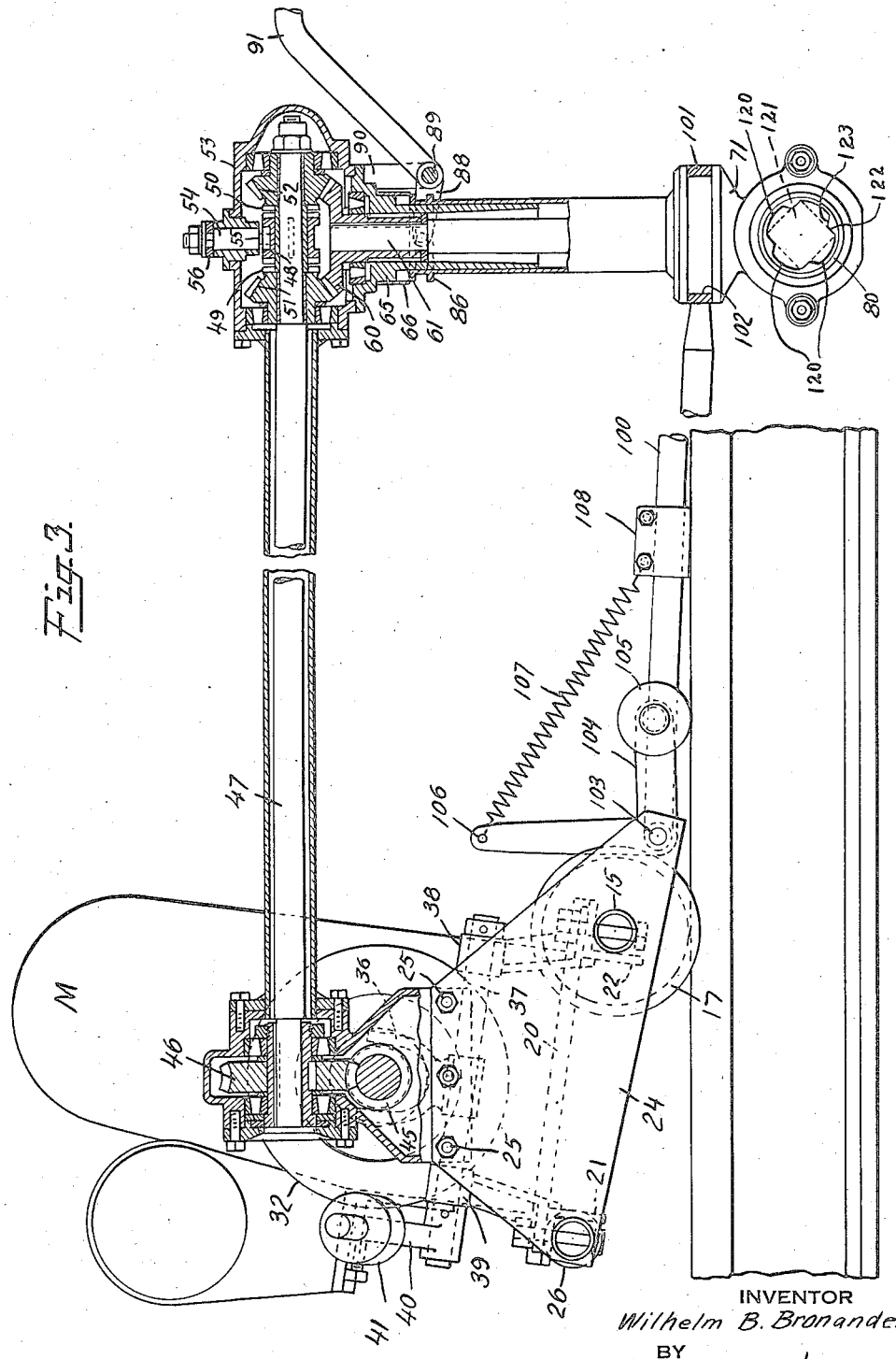

April 21, 1936. W. B. BRONANDER 2,037,701
MACHINE OR APPARATUS FOR USE ON RAILWAY TRACKS
Filed Oct. 6, 1933 4 Sheets-Sheet 3
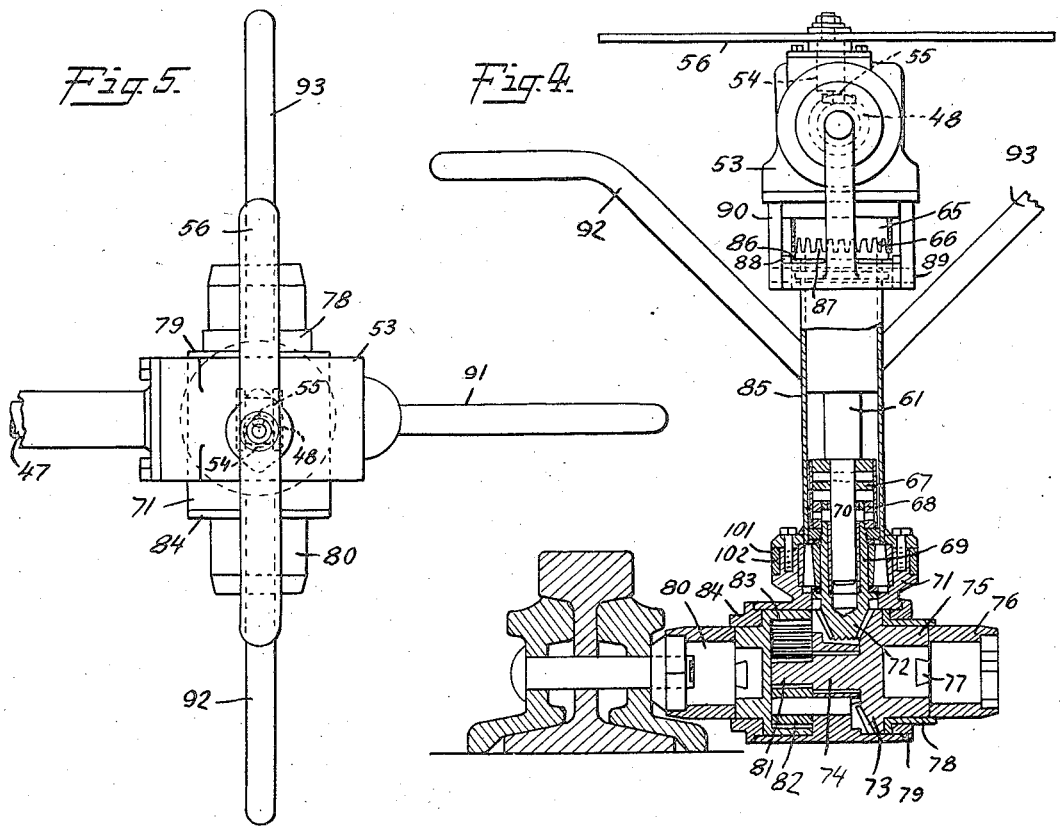
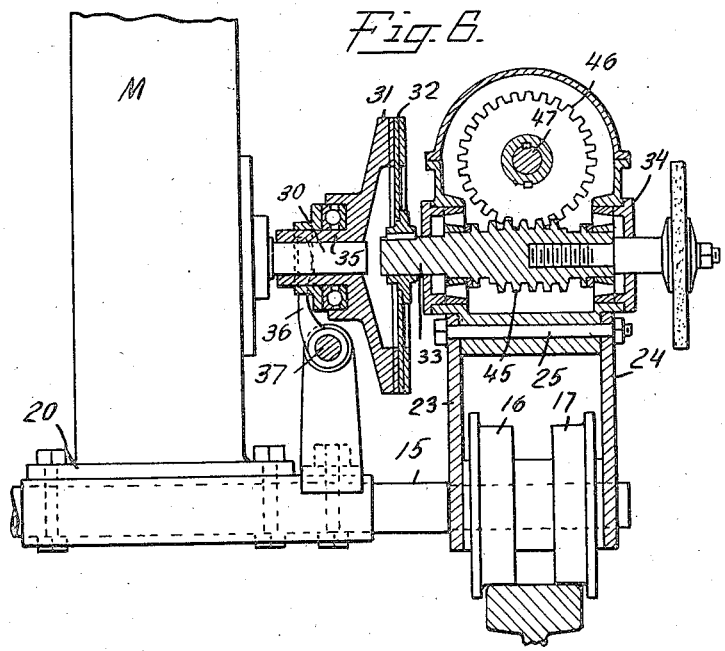
INVENTOR
Wilhelm B. Bronander
BY
Marshall & Hawley
ATTORNEYS April 21, 1936. W. B. BRONANDER 2,037,701
MACHINE OR APPARATUS FOR USE ON RAILWAY TRACKS
Filed Oct. 6, 1933  4 Sheets-Sheet 4
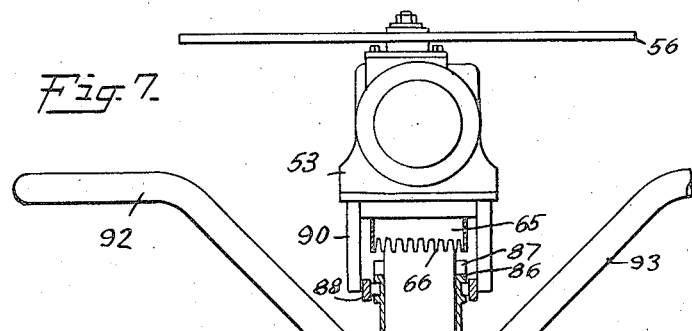
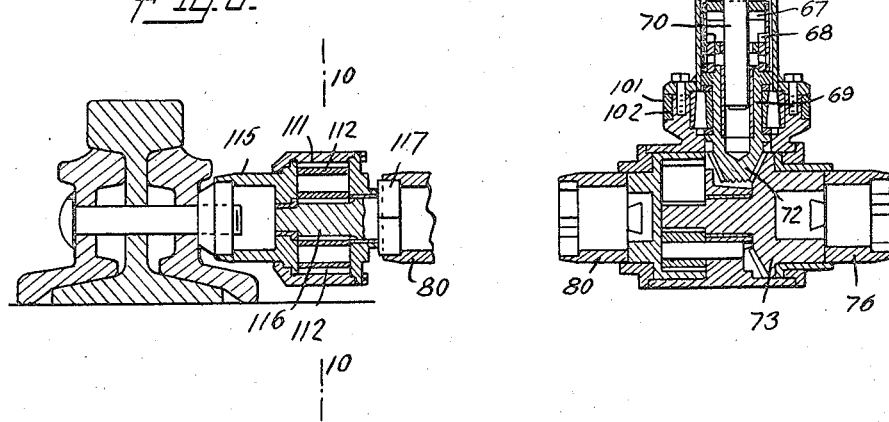
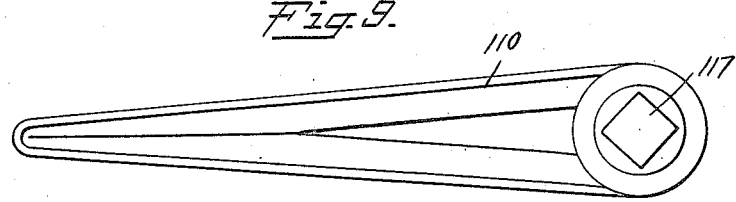
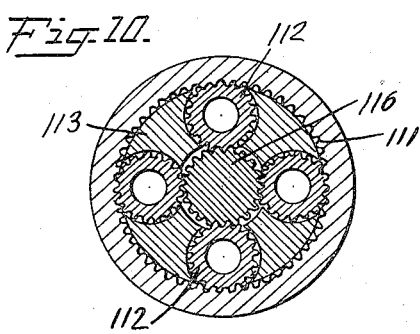
INVENTOR
Wilhelm B. Bronander
BY
Marshall & Hawley.
ATTORNEYS Patented Apr. 21, 1936

2,037,701

UNITED STATES PATENT OFFICE 2,037,701

MACHINE OR APPARATUS FOR USE ON RAILWAY TRACKS

Wilhelm B. Bronander, Montclair, N. J.

Application October 6, 1933, Serial No. 692,381

12 Claims. (Cl. 81—57)

This invention relates to a machine or apparatus for use on railway tracks and particularly to a machine for screwing or "running" nuts on the bolts or for unscrewing said nuts from the bolts used to connect the fish plates to each other and to the rails.

It is most essential for the proper joining of the rails on a railroad that the fish plates or plates used to join rails be tightly and securely held in place. The nuts which secure the fish plate bolts are often rusted on the bolts and it is very difficult to loosen and unscrew them to permit new bolts to be put in place.

This invention has for its salient object to provide a simple and practical machine constructed for transportation along the rails and having power driven means for screwing and unscrewing the nuts of fish plate bolts.

Another object of the invention is to provide a machine of the character described so constructed and arranged that the operative mechanism can be adjusted for operation inside or outside of the rails and can be adjusted to properly engage the nuts.

Another object of the invention is to provide apparatus of the character described having a plurality of reduction gear driving connections adapted for use as the occasion requires.

Further objects of the invention will appear from the following specification taken in connection with the drawings which form a part of this application, and in which Fig. 1 is a side elevational view showing apparatus embodying the invention mounted on the rails of the railroad track;

Fig. 2 is a top plan view of the construction shown in Fig. 1;

Fig. 3 is a sectional elevation on an enlarged scale showing the drive from the engine shaft to the intermediate shaft from which the tool shaft is driven;

Fig. 4 is an elevational view partly in section showing the driving connections for the tool head or socket head for operating on the fish bolt nuts;

Fig. 5 is a top plan view of the structure shown in Fig. 4;

Fig. 6 is a detail sectional elevation showing the driving connections between the engine shaft and the transmission shaft;

Fig. 7 is a detail sectional elevation showing the adjustment for varying the angle of the tool head;

Fig. 8 is a sectional elevation showing a reduction drive attachment adapted to be used as a supplemental reduction drive with the driving connections shown in detail in Fig. 4;

Fig. 9 is an end elevation of the section shown in Fig. 8; and

Fig. 10 is an enlarged sectional elevation taken substantially on line 10—10 of Fig. 8.

The invention briefly described consists of apparatus comprising a frame adapted to be rolled along a railway track, having mounted thereon a suitable motor, such as a gasoline engine, driving connections between the engine and a transmission shaft which extends along one rail and substantially at right angles to the axle of the frame of the apparatus. On the front end of the transmission shaft is mounted a reversible driving connection which is arranged to drive a gear at the upper end of a vertically disposed shaft. On the lower end of the shaft is mounted a casing which carries a pair of sockets engageable with the fish bolt nuts and arranged to screw or unscrew the nuts. Two sockets are carried by the casing, separate driving connections being provided for each, one of the sockets being driven through a reduction gearing. A clutch at the upper end of the shaft determines the direction of drive of the sockets. Furthermore, a supplemental driving connection or attachment is provided for use in conjunction with the reduced drive connection carried by the casing, by means of which a further reduction can be obtained. This supplemental attachment is used particularly for unscrewing rusted nuts or can be used to shear off the nuts in case they cannot be loosened. The apparatus is so constructed and mounted that the casing which carries the nut sockets can be angularly adjusted to any desired angle so as to obtain a proper grip or connection with the nut.

Further details of the invention will appear from the following description.

In the particular embodiment of the invention illustrated in the drawings the apparatus is mounted on an axle 15 having flanged wheels 16 and 17 at one end thereof and a cylindrical roller 18 at the other end thereof, a conical collar 19 being mounted at the inner end of the roller to facilitate the positioning of the roller on the rail.

A motor M, such as a gasoline engine, is mounted on a bed plate 20 carried by frame members 21 and 22, the frame member 22 being mounted on the axle 15. A second frame is mounted on the axle 15 outside the wheels 16 and 17 and comprises side plates 23 and 24 which are secured together by bolts 25. A roller 26 is mounted between the side plates 23 and 24 at the rear lower ends thereof.

The motor M drives an engine shaft 30 on the outer end of which is mounted a disk 31 engageable with a disk 32 carried by a shaft 33 mounted in a casing 34 which in turn is mounted on the frame formed by the side plates 23 and 24. The disk 31 is carried by or formed on a sleeve 35 which is slidably mounted on the engine shaft 30 and is urged in a direction toward the disk 32 by means of a yoke 36 which engages a grooved collar on the sleeve 35 and is carried by a spindle 37 mounted in brackets 38 and 39 which are secured to the frame members 21 and 22. An arm 40 is secured to one end of the spindle 37 and has adjustably mounted thereon a weight 41. The action of the weight and lever arm 40 tends to move the spindle 37 in a clockwise direction viewing Fig. 6, thus forcing the disk 31 against the disk 32. The weight 41 can be adjusted on the arm 40 to exert any desired force on the contact between disks 31 and 32 and this adjustment will determine how tight a nut will be screwed up on a bolt for after the nut has been screwed on to the desired extent slippage will take place between the disks.

The shaft 33 has mounted thereon a worm 45 which meshes with a worm gear 46 which is keyed to a transmission shaft 47. The front end of the transmission shaft has splined thereon a clutch member 48 which is slidably mounted and is adapted to engage complementary clutch members 49 or 50 carried by or formed on bevel gears 51, 52.

The parts mentioned in the preceding paragraph are enclosed in a casing 53 and a stud or spindle 54 is rotatably mounted in the top of the casing and has formed on the lower end thereof an offset pin 55 which engages the clutch member 48. A handle 56 is secured to the upper end of the spindle or stud 54 and by rotating the stud by means of the handle the clutch member 48 can be moved to engage one or the other of the complementary clutch members 49, 50.

The gears 51 and 52 mesh with a bevel gear 60 which is mounted on the upper end of a vertical shaft 61 which extends downwardly through the casing 53. The direction of drive of the gear 60 and shaft 61 will depend on which of the gears 51 or 52 is driven by the clutch member 48.

The casing 53 has extending downwardly therefrom a sleeve 65 having depending teeth 66, the sleeve and teeth surrounding the shaft 61 and being spaced therefrom. The shaft 61 has connected to the lower end thereof a clutch member 67 which is adapted to engage a complementary clutch member 68 carried by the upper end of a hollow shaft 69. The shaft 69 receives the lower end 70 of the shaft 61.

The shaft 69 is carried by a tool head casing 71 and has formed on or secured to the lower end thereof a bevel gear 72. This gear meshes with a gear 73 carried by a stub shaft 74 and has a sleeve 75 extending therefrom in a direction opposite to the shaft 74. A nut socket 76 is carried by the sleeve 75 and has a dove-tail connection 77 therewith, the socket being held in position on the sleeve by means of a sleeve 78 which surrounds the sleeve 75 and the inner portion of the socket 76. The sleeve 78 is secured in place by means of a flanged ring 79 which is bolted in position on the casing 71.

It will be obvious that as the shaft 61 is driven in the manner hereinbefore described that the shaft 69 will also be driven when the clutch members 67 and 68 are engaged and thus the gears 72 and 73 will rotate the nut socket 76.

In addition to the nut socket 76 carried by the casing 71 a second nut socket 80 is also carried by the casing and is driven at a reduced rate of rotation and in a direction opposite to the direction of the shaft 74 and socket 76. This is accomplished by a gearing comprising a pinion gear 81 connected to one end of the shaft 74, idler gears 82 meshing with and driven by the pinion 81 and a ring gear 83 which surrounds and meshes with the idler gears and is in turn connected to the socket 80. The socket 80 and ring gear are held in position by a collar 84 which is bolted to the casing or to the flanged ring 79. The chuck or socket 80 is formed in the manner shown in Fig. 3, arcuate portions 120 having radii equal to the distance from the center of the opening or socket to the corners of the nut 121 and is further provided with oppositely inclined shoulders 122, 123 adapted to engage the side of the nut. This permits a limited movement of the chuck or socket before the load is applied and is of especial advantage when the chuck is used to unscrew a nut.

Since the apparatus above described is used to tighten or unscrew nuts on the fish plate bolts both inside and outside of the rails means is provided for so adjusting the tool head or casing 71 as to provide for proper engagement between the sockets carried thereby and the nuts. In order to accomplish this the tool head or casing 71 is mounted for angular adjustment around the axis of the shaft 61. A tubular casing 85 is secured to the casing 71 and extends upwardly therefrom around the shaft 61. The upper end of the tubular casing 85 has formed on or secured thereto a collar 86 having teeth 87 adapted to engage the teeth 66 formed on the sleeve 65. The collar 86 is engaged by arms 88 carried by a spindle 89 mounted in a bracket 90 secured to the casing 53. A lever arm 91 is also secured to the spindle 89 and by moving the lever arm up or down the arms 88 will also be moved, thus moving the tubular casing 85 in a vertical direction. When the tool head casing or socket casing is to be angularly adjusted the arm 91 is raised, thus freeing the teeth 87 from the teeth 66. This movement will also free the clutch members 67 and 68 from driving engagement with each other and the tubular casing 85 and parts carried thereby can be rotated to the desired position to bring the socket casing at the right angle to the rails to properly engage the nuts. After this position has been reached a downward pressure is exerted on the arm 91, thus moving the teeth 87 and 66 into engagement with each other, and by maintaining pressure on the arm 91 this engagement will be maintained. The movement of the sockets into engagement with the nuts can be controlled by handles 92 and 93 and the other hand of the operator can exert a pressure on the arm 91 and maintain the parts in their adjusted position.

The teeth of the clutch members 67 and 68 and the teeth 66 and 87 are so proportioned as to length that the clutch member teeth 67 and 68 will move out of engagement before the teeth 66 and 87 are freed and vice versa.

The casing 71 is further held and steadied during the use of the apparatus by means of a link 100 which is secured at its front end to a ring 101 which is mounted in a groove 102 formed in the casing 71 and thus the casing can swivel. The other end of the link 100 is pivoted on a stud 103 which extends between the front end portions of the side frames 23 and 24.

When the apparatus is in use the frame is tilted in the manner illustrated in Fig. 3 and is counterbalanced when in this position by means of a lever comprising a pair of bell crank levers 104 mounted on the stud 103 and having rollers 105 at one end thereof, the other ends being connected by a pin 106 to which is connected a spring 107 having its opposite end connected to a bracket 108 carried by the link 100. When the transmission shaft 47 is swung to a position in which the apparatus is adjusted to operate on the nuts at one side of the rail one of the rollers 105 will rest on the rail and when the apparatus is adjusted to operate on nuts on the other side of the rail the other roller 105 will rest on the rail. The action of the spring 107 on the bell crank levers is to counterbalance the weight of the tool head and the driving connections carried thereby.

Under certain conditions as when a nut is rusted on the bolt it is desirable to provide a further reduction in the rate of rotation of the socket than that obtained by the reduction gearing shown in Fig. 4. Under these conditions the attachments shown in Figs. 8 to 10 inclusive may be used. This attachment comprises a supplemental planetary gearing which is carried by an arm 110 and comprises a ring gear 111 fixed to the arm 110, planet gears 112 meshing with the ring gear and carried by a spider comprising arcuate portions 113 arranged between the planet gears and within which the planet gears rotate. The spider has formed on or connected thereto a socket 115 for engagement with the nut to be loosened.

Within the planet gears 112 is positioned a pinion 116 having a head 117 adapted to engage in the socket 80 of the socket or tool casing 71.

It will be obvious that as the pinion 116 is rotated the planet gear spider will be driven at a reduced speed since the ring gear 111 is held against rotation, thus a supplemental reduction in the rate of rotation of the socket 115 is obtained.

*Operation*

The casing 85 is first so adjusted relative to the casing 53 as to properly engage the nuts to be operated on. This is done by a manipulation of the arm 91 in the manner hereinbefore described. The clutch member 48 is so set as to drive the shaft 61 in the desired direction and the power derived from the engine M will then cause the nut to be screwed or unscrewed by the engagement with one of the sockets 76 or 80. Should it, however, be impossible to loosen or shear off the nut by means of the reduction drive shown in Fig. 4 the supplemental reduction driving connection shown in Figs. 8 to 10 inclusive may be used by placing the head 117 in the socket 80 whereupon the socket 115 will be rotated at a still further reduction in speed.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. Apparatus of the character described comprising a vertical shaft, an engine, operative driving connections between the engine and shaft for driving the shaft in either direction, a casing disposed at the bottom of said shaft and having a pair of tools operatively connected to the vertical shaft and extending substantially at right angles thereto in opposite directions, for operation thereby at different speeds, and operative driving connections in said casing between said vertical shaft and each tool, one of said driving connections driving its tool at a lower rate of speed than the driving connection for the other tool.

2. Apparatus of the character described comprising a vertical shaft, an engine, operative driving connections between the engine and shaft for driving the shaft in either direction, a casing disposed at the bottom of said shaft and having a pair of tools operatively connected to the vertical shaft and extending substantially at right angles thereto in opposite directions, for operation thereby at different speeds, said casing and tools being mounted for angular adjustment about the axis of the vertical shaft, and operative driving connections in said casing between said vertical shaft and each tool, one of said driving connections driving its tool at a slower rate of speed than the driving connection for the other tool.

3. Apparatus of the character described comprising a frame, an engine, a shaft driven thereby, a transmission shaft connected thereto, a vertical shaft operatively connected to the transmission shaft and arranged for driving in either direction thereby, a casing disposed at the bottom of said shaft and having a pair of tools operatively connected to the vertical shaft and extending substantially at right angles thereto in opposite directions, for operation thereby at different speeds, said casing and tools being mounted for angular adjustment about the axis of the vertical shaft, and operative driving connections in said casing between said vertical shaft and each tool, one of said driving connections driving its tool at a slower rate of speed than the driving connection for the other tool.

4. Apparatus of the character described comprising a frame, means for supporting said frame on a railroad track for limited angular movement thereon, an engine, a shaft driven thereby, a transmission shaft connected thereto, a vertical shaft operatively connected to the transmission shaft and arranged for driving in either direction thereby, a casing disposed at the bottom of said shaft and having a pair of tools operatively connected to the vertical shaft and extending substantially at right angles thereto in opposite directions, for operation thereby at different speeds, said casing being rotatably adjustable to move either tool to operative position, and operative driving connections in said casing between said vertical shaft and each tool, one of said driving connections driving its tool at a slower rate of speed than the driving connection for the other tool.

5. Apparatus of the character described comprising a frame, an engine thereon, a transmission shaft driven by said engine, a shaft operatively connected to said transmission shaft by a reversible driving connection, a casing around said reversible driving connection, a tubular casing carried by said first casing and surrounding said second shaft, said tubular casing being angularly adjustable on its axis, a plurality of tools operatively connected to said second shaft and carried by said tubular casing and operative driving connections between said second shaft in each tool, one of said driving connections operating to drive its tool at a slower rate of speed than the driving connection for the other tool.

6. Apparatus of the character described comprising a frame, an engine thereon, a transmission shaft driven by said engine, a shaft operatively connected to said transmission shaft by a reversible driving connection, a casing around said reversible driving connection, a tubular casing carried by said first casing and surrounding said second shaft, said tubular casing being angularly adjustable on its axis, a plurality of tools operatively connected to said second shaft and carried by said tubular casing, said tools being driven at different rates of rotation and operative driving connections between said second shaft in each tool, one of said driving connections operating to drive its tool at a slower rate of speed than the driving connection for the other tool.

7. Apparatus of the character described comprising a transmission shaft, a casing carried thereby, a second casing angularly adjustable relative thereto, a vertical shaft extending from the first casing into the second casing, a second shaft in said second casing, a clutch connecting said vertical shaft and second shaft, a tool head having a pair of shafts driven by said second shaft at different speeds, and operative driving connections between said second shaft and each tool, one of said driving connections operating to drive its tool at a slower rate of speed than the driving connection for the other tool.

8. Apparatus of the character described comprising a transmission shaft, a casing carried thereby, a second casing angularly adjustable relative thereto, a vertical shaft extending from the first casing into the second casing, a second shaft in said second casing, a clutch connecting said vertical shaft and second shaft, a tool head carried by said second casing and having a pair of shafts driven by said second shaft at different speeds, and operative driving connections between said second shaft and each tool, one of said driving connections operating to drive its tool at a slower rate of speed than the driving connection for the other tool.

9. Apparatus of the character described comprising a transmission shaft, operative driving connections therefor, a vertical shaft operatively connected to the transmission shaft, a casing around said vertical shaft, a clutch member on said vertical shaft, a second vertical shaft having a clutch member arranged to coact with the first clutch member, a pair of tools operatively connected to said second vertical shaft, and a casing around said tools and second shaft, said casing being vertically movable and angularly adjustable relative to said first casing, the relative vertical movement disconnecting said clutch members.

10. Apparatus of the character described comprising a transmission shaft, operative driving connections therefor, a vertical shaft operatively connected to the transmission shaft, a casing around said vertical shaft, a clutch member on said vertical shaft, a second vertical shaft having a clutch member arranged to coact with the first clutch member, a pair of tools operatively connected to said second vertical shaft, and a casing around said tools and second shaft, said casing being vertically movable and angularly adjustable relative to said first casing, the relative vertical movement disconnecting said clutch members, said casings having interengaging means for preventing relative angular movement and means for moving one casing relative to the other to disengage said means to permit relative angular adjustment thereof.

11. Apparatus of the character described for use on a railway track comprising a frame, a power unit thereon, an axle having wheel supporting means beneath said frame arranged to rest on one rail, said supporting means including oppositely facing flanged wheels so spaced apart as to permit a limited angular movement of the axle relative to the rail on a vertical axis midway between the flanged wheels, a cylindrical wheel at the other end of the axle engageable with the other rail of the track in various angular positions of adjustment of the frame, a transmission shaft having one end mounted in and extending forwardly of the frame over one rail and operatively connected to the power unit, and a tool head mounted on the end of said shaft and having a pair of tool shafts driven thereby.

12. Apparatus of the character described for use on a railway track comprising a frame, a power unit thereon, an axle having wheel supporting means beneath said frame arranged to rest on one rail, said supporting means including oppositely facing flanged wheels so spaced apart as to permit a limited angular movement of the axle relative to the rail on a vertical axis midway between the flanged wheels, a cylindrical wheel at the other end of the axle engageable with the other rail of the track in various angular positions of adjustment of the frame, a transmission shaft having one end mounted in and extending forwardly of the frame over one rail and operatively connected to the power unit, and a tool head mounted on the end of said shaft and having a pair of tool shafts driven thereby, said tool head being mounted for angular adjustment relative to the axis of the transmission shaft and for angular adjustment at right angles thereto.

WILHELM B. BRONANDER.